T. P. BROOKE.
MOTOR.
APPLICATION FILED AUG. 10, 1916.

1,238,488.

Patented Aug. 28, 1917.

Witness
H. E. Barrett

Inventor
Thomas P. Brooke
By J. Jochum Jr.
Attys.

UNITED STATES PATENT OFFICE.

THOMAS P. BROOKE, OF CHICAGO, ILLINOIS.

MOTOR.

1,238,488.

Specification of Letters Patent.   Patented Aug. 28, 1917.

Original application filed November 14, 1912, Serial No. 731,244. Divided and this application filed August 10, 1916. Serial No. 114,106.

*To all whom it may concern:*

Be it known that I, THOMAS P. BROOKE, a citizen of the United States, residing at Chicago, in the county of Cook and State of Illinois, have invented certain new and useful Improvements in Motors, of which the following is a specification.

This application is a division of my original application, Serial No. 731244, filed in the United States Patent Office, November 14th, 1912, and more particularly the present invention relates to improvements in the valve mechanism of that type of engine which is so constructed that the cylinders revolve around a common center in one direction and the crank rotates in a direction opposite thereto, the piston valves being so constructed and arranged as to prevent the centrifugal force thus created from unduly influencing them in their opening and closing movements and the invention has for one of its objects to provide improved means by which the operation of the said valves will be controlled.

To the attainment of these ends and the accomplishment of other new and useful objects as will appear, the invention consists in the features of novelty in substantially the construction, combination and arrangement of the several parts hereinafter more fully described, and claimed and shown in the accompanying drawings illustrating the invention and in which:

Figure 1:
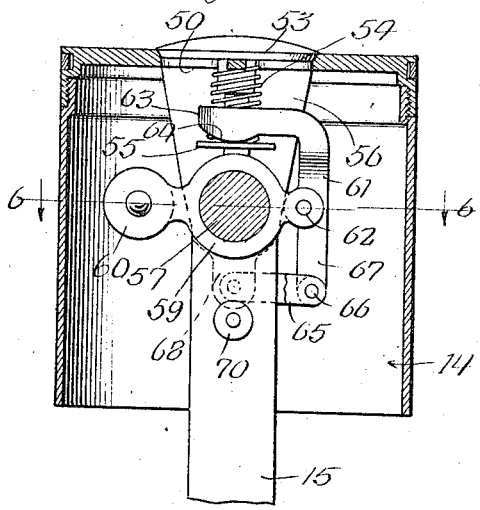
Figure 1 is a view partly in elevation and partly in longitudinal section of the piston and the piston valve.
Figure 2:
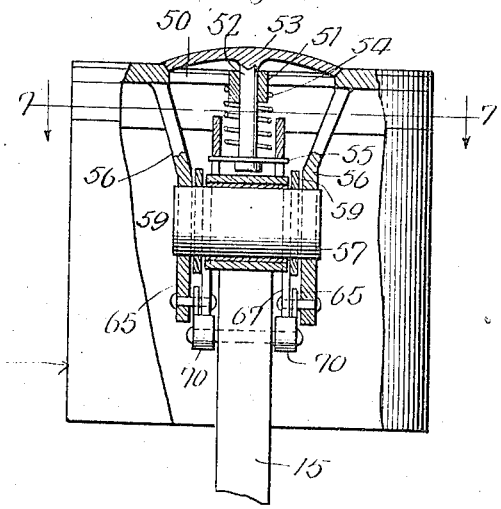
Fig. 2 is a view partly in elevation and partly in section and partly broken away showing the piston and the piston valve mechanism.
Figure 3:
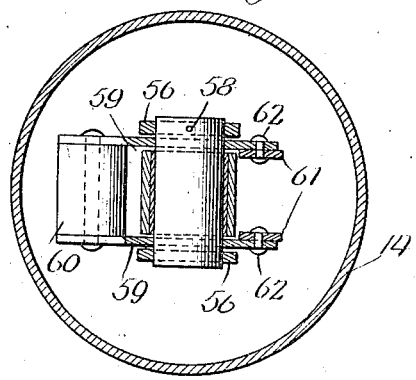
Fig. 3 is a sectional view as taken on line 6—6, Fig. 1.
Figure 4:
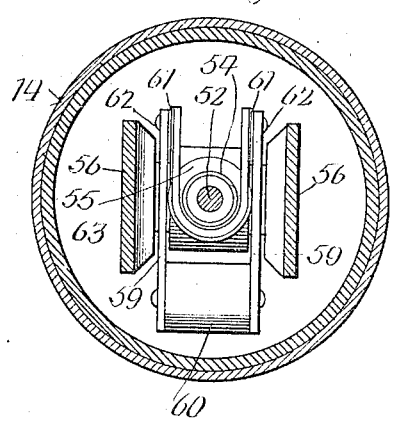
Fig. 4 is a sectional view as taken on line 7—7, Fig. 2.
Figure 5:
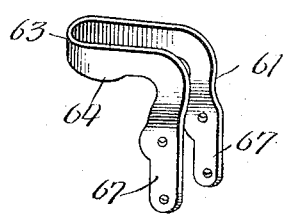
Fig. 5 is a perspective view of a detail.

The piston 14 to which the piston rod 15 is pivotally connected is hollow, and the head is provided with an opening having a spider 50 extending thereacross, within which spider is arranged a bearing 51 for the stem 52 of the valve 53, the latter being seated upon the outside of the piston while the stem 52 extends into the piston. An elastic member 54 such as a coil spring surrounds the stem 52 and one end engages a shoulder 55 on the valve stem, and the other portion of the spider, and tends normally to hold the valve to its seat.

Projecting from the inside of the head of the piston are extensions 56 between which the end of the piston rod 15 projects and the piston rod is provided with an eye for the reception of a pin 57 which passes through the eye and also through alined openings in the extensions 56, whereby the piston rod is connected with the piston and if desired a fastening pin 58 may be provided for locking the pin 58 against displacement.

Pivotally mounted upon the pin 57 and at points intermediate their ends are spaced arms 59, and these arms are preferably located between the piston rod and respective extensions 56 of the piston head. The extremities of these arms project for some distance beyond the pin 57 and a counterweight 60 is secured between adjacent extremities of the arms and on one side of the pin, while a yoke designated generally by the reference numeral 61 in Fig. 8, is pivoted as at 62 between the other extremities of the arms 59. This yoke is provided with a laterally extended portion 63 having a cam face 64 and the laterally extending portion projects above the shoulder 55 on the valve stem, and stands on each side of the stem so that the cam portion 64 will engage the face of the shoulder next the valve. The sides of the yoke 61 project for some distance below the pivots 62, and links 65 are pivotally connected by one extremity as at 66 to the ends of the extensions 67 and by their other extremities to projecting portions 68 of the extensions 56. So that when the arms 59 are oscillated about the pin 57 as a pivot, the yoke 61 will have a substantially straight movement with respect to the wall of the body of the piston, this being accomplished by the proper arrangement of the pivots 62, 66.

One of these links 65 is preferably arranged on each side of the piston rod 15 and carried by the piston rod are anti-friction rollers 70, one arranged on each side thereof and adapted to engage the respective links 65. With this construction it will be manifest that when the piston rod 15 is given its oscillating movement about the pin 57, the rollers 70 will be moved into or out of engagement with the respective links 65 and will operate upon these links at the proper times to move them about their points of pivotal connection with the extensions 56, and thereby raise or shift the yoke 61 to raise the cam face 64 with respect to the shoulder 55, and thereby release the valve so that it can be unseated against the tension of the elastic member 54, by the suction created in the explosion end of the cylinder, when the piston is moved away from the explosion end, to draw a charge into such end of the cylinder and also by centrifugal force on the valve. The valve 53 is thus released each time the piston makes an inward stroke or a stroke in a direction away from the explosion end of the cylinder. But the valve will only be unseated to uncover the opening in the piston head to admit a charge of fuel to the explosion end of the cylinder for each explosion, for the following reason.

Assuming that the motor in which this piston is used is of a four cycle type, and assuming further that there has been an explosion in the cylinder, the piston will be at the limit of its inward movement after such explosion. The first movement of the piston toward the explosion end after the explosion, will force the burnt gases out of the exhaust. Upon the return of the piston, the valve 53 will be released in the manner above described, so that the suction in the cylinder will unseat the valve and a charge of fuel will be drawn into the explosion end of the cylinder. Upon the next outward movement of the piston, the valve will be seated while the charge is being compressed and upon the next inward movement of the piston, although the valve will be released, it will not be unseated because it will be held to its seat by the pressure of the gases behind the valve.

The counter-balance 60 and the arms 59 operate in such a manner as to return the yoke when the anti-friction rollers 70 have passed out of engagement with the links 65.

What is claimed as new is:—

1. The combination of a piston, a valve therein, a piston rod, an element carried with the piston and operating to close the valve, a weighted arm pivotally connected with the piston and also with the said element, a link connected with the said element and the piston, and means connected with the piston rod and adapted to engage and move the link to shift the said element to release the valve.

2. The combination of a piston, a piston rod connected therewith, a valve in the piston, an element connected with the piston for movement therewith and with respect thereto, a weighted arm pivotally connected to the element and to the piston, the recited parts operating upon the valve to close the latter, a connection between the said element and the piston, and means operating upon the said connection for shifting the said element against the stress of the said arm for releasing the valve.

3. The combination of a piston, a piston rod connected therewith, a valve in the piston, an element connected with the piston for movement therewith and with respect thereto, a weighted arm pivotally connected to the element and to the piston, the recited parts operating upon the valve to close the latter, a connection between the said element and the piston, said piston rod being provided with a lateral projection in the path of movement of which the said connection is located and adapted to be engaged and moved by the projection to shift the said element to release the valve.

4. The combination of a piston, a piston rod, a valve in the piston, a yoke, a link pivotally connected with the yoke and also with the piston, an element pivotally connected intermediate its ends with the piston, one end of the element having pivotal connection with the yoke, the other end of the element being weighted, said yoke operating to close the valve, and means for intermittently shifting the yoke to release the valve.

5. The combination of a piston, a piston rod, a valve in the piston, a yoke, a link pivotally connected with the yoke and also with the piston, an element pivotally connected intermediate its ends with the piston, one end of the element having pivotal connection with the yoke, the other end of the element being weighted, said yoke operating to close the valve, and means connected with the piston rod for intermittently shifting the yoke to release the valve.

6. The combination of a piston, a piston rod, a valve in the piston, a yoke, a link pivotally connected with the yoke and also with the piston, an element pivotally connected intermediate its ends with the piston, one end of the element having pivotal connection with the yoke, the other end of the element being weighted, said yoke operating to close the valve, and means connected with the piston rod and engaging the link to shift the yoke.

7. The combination of a piston, a piston rod, a valve in the piston, a yoke, a link pivotally connected with the yoke and also with the piston, an element pivotally connected intermediate its ends with the piston, one end of the element having pivotal connection with the yoke, the other end of the element being weighted, said yoke operating to close the valve, and means adapted to engage and shift the link to move the yoke for intermittently releasing the valve.

8. The combination of a piston, a piston rod, a valve in the piston, a yoke, a link pivotally connected with the yoke and also with the piston, an element pivotally connected intermediate its ends with the piston, one end of the element being pivotally connected with the yoke, the other end being weighted, and a link having pivotal connection with the yoke and with the piston, there being a projection on the piston rod adapted to engage and shift the link to move the yoke and release the valve.

9. The combination of a piston, a piston rod, a valve in the piston, a yoke, a link pivotally connected with the yoke and also with the piston, an element pivotally connected intermediate its ends with the piston, one end of the element being pivotally connected with the yoke, the other end being weighted, and a link having pivotal connection with the yoke and with the piston, there being a projection on the piston rod adapted to engage and shift the link to move the yoke and release the valve, the said yoke extending lengthwise of the piston.

10. The combination of a piston, a piston rod, a valve in the piston, a yoke, a link pivotally connected with the yoke and also with the piston, an element pivotally connected intermediate its ends with the piston, one end of the element being pivotally connected with the yoke, the other end being weighted, and a link having pivotal connection with the yoke and with the piston, there being a projection on the piston rod adapted to engage and shift the link to move the yoke and release the valve, the points of pivotal connection of the said element and the said link with the yoke being spaced from each other longitudinally of the piston and arranged substantially in alinement.

11. The combination of a piston, a piston rod, a valve in the piston, a yoke, a link pivotally connected with the yoke and also with the piston, and an element pivotally connected intermediate its ends with the piston, one end of the element being pivotally connected with the yoke, the other end being weighted, there being a projection on the piston rod adapted to engage and shift the link to move the yoke and release the valve, the said link extending for some distance in the path of movement of the said projection.

In testimony whereof I have signed my name to this specification, in the presence of two subscribing witnesses, on this 8th day of August, A. D. 1916.

THOMAS P. BROOKE.

Witnesses:
 IRMA M. BARING,
 J. H. JOCHUM, Jr.

Copies of this patent may be obtained for five cents each, by addressing the "Commissioner of Patents, Washington, D. C."